Figure 1:
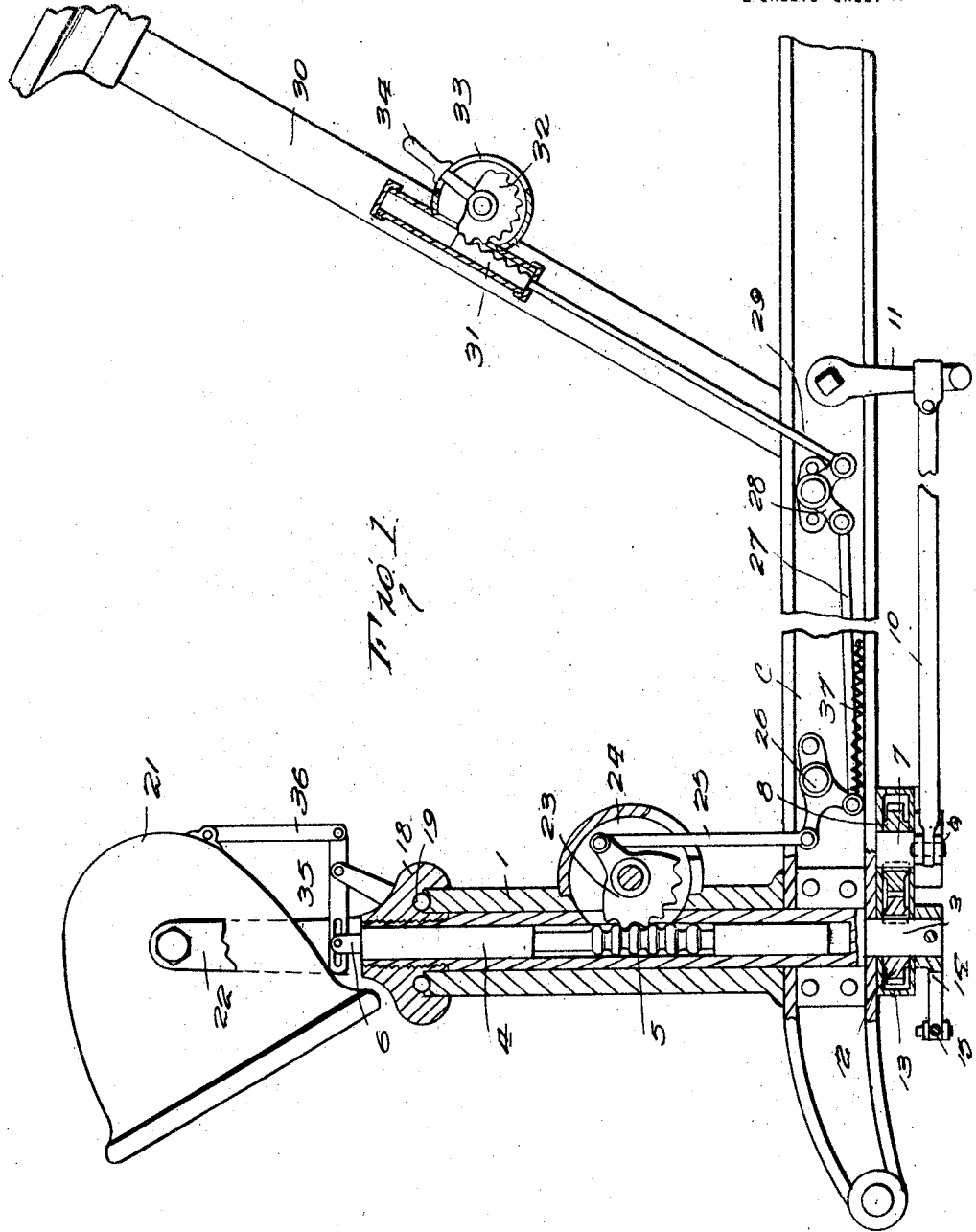

W. W. KENNARD.
DIRIGIBLE HEADLIGHT.
APPLICATION FILED MAY 14, 1918.
1,339,352.
Patented May 4, 1920.
2 SHEETS—SHEET 2.
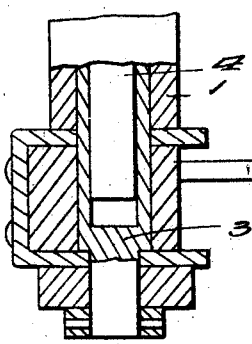
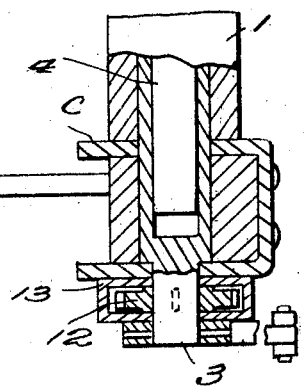
Fig. 2.
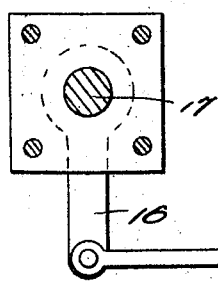
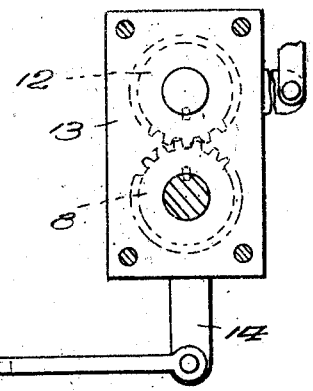
Fig. 3.
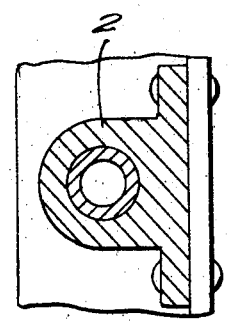
Fig. 4.
William W. Kennard
Inventor
By Geo. P. Kimmel
Attorney

UNITED STATES PATENT OFFICE.

WILLIAM W. KENNARD, OF SEWICKLEY, PENNSYLVANIA.

DIRIGIBLE HEADLIGHT.

1,339,352.  Specification of Letters Patent.  Patented May 4, 1920.

Application filed May 14, 1918. Serial No. 234,392.

*To all whom it may concern:*

Be it known that I, WILLIAM W. KENNARD, a citizen of the United States, residing at Sewickley, in the county of Allegheny and State of Pennsylvania, have invented certain new and useful Improvements in Dirigible Headlights, of which the following is a specification.

This invention relates to improvements in dirigible headlights and it is the principal object of the invention to provide a dirigible headlight particularly adapted for use in connection with motor driven vehicles whereby the same will be caused to turn with the steering wheels in a horizontal plane and if desired, moved in a vertical plane to vary the distance of the projection of the light rays emitted therefrom.

Another and equally important object of the invention is to provide a headlight of the character mentioned which can be moved independently of the steering gear of a vehicle to vary the angle of position thereof in order that the glare from the same can be lessened or entirely eliminated as may be desired.

Other objects will be in part obvious and in part pointed out hereinafter.

The invention consists, furthermore, in the novel arrangements and combinations of the parts of the headlight, as well as in the details of the construction of the same, all of which will be more fully described in the following specification, and then finally embodied in the clauses of the claim which are appended to this specification and which form an essential part thereof.

In the drawings;

Figure 1 is a vertical section through the improved headlight showing the same applied to a fragment of a vehicle chassis and to the steering column thereof, Fig. 2 is a fragmentary vertical transverse section therethrough, Fig. 3 is a horizontal transverse section through the same, and Fig. 4 is a detail in section through the shaft bearing.

Having more particular reference to the drawings, in connection with which like reference characters will designate corresponding parts throughout the several figures, *c* represents a portion of a frame of a motor driven vehicle, the forward portions of which have my improved dirigible headlights arranged thereon. In this connection, it is to be noted, however, that the construction of these headlights is identical and therefore reference will be had to but one in the description to follow, for the purpose of convenience.

Mounted on the forward portion of the vehicle frame at each side is a hollow standard 1, each of said standards being secured against undue displacement by means of a bracket 2 arranged about the lower end thereof and secured to the adjacent portion of the frame *c* by suitable fastening devices. Rotatably received in the standard 1 is a shaft 3, the upper portion of which is hollow and serves to receive a secondary shaft 4 therein having a rack element 5 formed upon its intermediate portion for a purpose hereinafter more fully described. Carried on the upper end of the shaft 4 is a bifurcated bracket element 6, which element is adapted to have connection with the means for moving the headlight to be presently described, in a vertical plane.

Mounted on the under side of the frame *c* at a point adjacent the lower end of the shaft 3 is a second shaft 7 carrying a pinion 12 thereon and an apertured arm 9, the outer end of which is pivotally connected to a rod 10 extending rearwardly into adjustable engagement with the ordinary steering gear 11 of a vehicle. A second pinion 8 is mounted on the lower end of the shaft 4 and normally meshes with the pinion 12; a suitable form of housing 13 being arranged about each of said gears for an obvious purpose. Hence, it is to be understood that when the arm 9 is rocked due to its connection with the steering gear 11, rotary motion will be imparted to the meshing gears 8 and 12 and consequently, to the shafts 3 and 4 for rotating the headlight therewith. To connect the headlight with the headlight arranged on the opposite sides of the vehicle frame, an arm 14 is fixedly mounted on the lower end of the shaft 13 and has pivotal connection with a rod 15 extending transversely of the forward portion of the frame into engagement with a similar arm 16 fixedly mounted on the lower end of a shaft 17 carrying said second mentioned headlight. Thus, it will be seen that the headlights will be moved collectively.

Rotatably engaged with the upper end of the hollow standard 1 is a cap member 18, anti-frictional bearings 19 being interposed between the same and the adjacent marginal portion of said standard for an obvious purpose. A screw threaded opening is formed in the cap member 18 and receives the complementally screw threaded upper end of the hollow portion of the shaft 3 therein as indicated in Fig. 1 whereby rotary motion can be transmitted thereto for moving the headlight 21 which, as will be noted, is pivotally supported in suitable bearings 22 carried by the cap member 18 in a horizontal plane.

To effect movement of the headlight 21 in a vertical plane, a segmental gear 23 is pivotally mounted in a housing 24 carried by the standard 1 and passing through suitable openings formed therein and in the hollow portion of the shaft 3 into engagement with the rack element 5 formed on the intermediate portion of the secondary shaft 4. This segmental gear is provided with an apertured arm having pivotal connection with a link 25 having its free end pivoted to one extremity of a bell crank lever 26 mounted on a portion of the frame c, which lever as will be noted is in turn pivotally connected to a link 27 having connection with a second bell crank lever 28, this bell crank lever being connected with the lower end of an operating rod 29 extending upwardly along the hollow steering column 30 of the vehicle and having a rack 31 formed on its upper end and engaged by a segmental gear 32 rotatably mounted in a suitable form of housing 33 secured to said steering column 30 and provided with an operating handle 34 for an obvious purpose. In this connection, I desire to have it understood that the housing 33 can be provided with a peripherally disposed slot having seats or notches formed in one side thereof to receive the handle 34 in order that the segmental gear 32 can be locked in an adjusted position to prevent further movement of the rod 29 and consequently the rack 31.

Pivotally connected links 35 and 36 are provided, the free end of the link 35 being slotted and pivotally connected to the bracket element 6 while the free end of the link 36 is pivoted to a suitable bracket carried on the adjacent portion of the headlight 21. To normally maintain the secondary shaft 4 in its lowermost position, a contractile coil spring 37 is engaged at one end with one extremity of the bell crank lever 26 and at its other end with the frame c.

In operation, it will be readily understood that upon movement of the steering gear 11, the shafts 3 and 4 and consequently the headlight 21 carried thereby will be caused to rotate and thus, the headlight is moved in a horizontal plane in order that the light rays emitted thereby will be projected into the direction in which the wheels of the vehicle are turned. Should it now be desired to vary the distance of the light rays from the headlight 21, the handle 34 is rocked, thus causing the segmental gears 23 to be correspondingly rocked and consequently imparting movement to the secondary shaft 4 by reason of its connection with the rack element 5 formed thereon. Since said shaft 4 has connection with the headlight 21, the same will of course be moved in a vertical plane and thus will be adjusted to the desired position. In this way, it is obvious that the glare from the headlight can be lessened or entirely eliminated, or if desired, the light rays can be projected for a considerable distance therebeyond. It is to be also noted, that the headlight can be previously adjusted to effect the desired projection of light rays therefrom thus avoiding the blinding of pedestrians or drivers of other vehicles upon the turning of the vehicle provided therewith.

Manifestly, the construction shown is capable of considerable modification and such modification as is within the scope of my claim, I consider within the spirit of my invention.

I claim:

A movable headlight of the character described comprising a tubular standard, a cap for said standard having a screw threaded opening formed therein and movable with respect to said standard, a rotatably mounted tubular shaft in said standard and connected with said cap, a headlight device connected with said cap, means for mounting said headlight device to swing vertically relative to said tubular shaft, a rod carried within and movable vertically with respect to said shaft, an encircling gear rack on said rod, a manually operable gear segment carried by said standard and engaging said gear rack for imparting vertical movement to said rod and means connecting said rod with the headlight device for moving the same on its transverse axis.

In testimony whereof I affix my signature hereto.

WILLIAM W. KENNARD.